US008287240B2

(12) United States Patent
Nitzpon (10) Patent No.: US 8,287,240 B2
(45) Date of Patent: Oct. 16, 2012

(54) METHOD FOR INSTALLING A ROTOR HUB ON A ROTOR SHAFT OF A WIND ENERGY PLANT, AND A WIND ENERGY PLANT

(75) Inventor: Joachim Nitzpon, Hamburg (DE)

(73) Assignee: Nordex Energy GmbH, Norderstedt (DE)

( * ) Notice: Subject to any disclaimer, the term of this patent is extended or adjusted under 35 U.S.C. 154(b) by 613 days.

(21) Appl. No.: 12/255,430

(22) Filed: Oct. 21, 2008

(65) Prior Publication Data
US 2010/0028153 A1 Feb. 4, 2010

(30) Foreign Application Priority Data
Aug. 2, 2008 (DE) .................... 10 2008 036 230

(51) Int. Cl.
*F03D 11/00* (2006.01)
*F03D 11/04* (2006.01)
(52) U.S. Cl. .................. 416/204 R; 416/244 R; 290/55
(58) Field of Classification Search .................. None
See application file for complete search history.

(56) References Cited

U.S. PATENT DOCUMENTS
2006/0196288 A1* 9/2006 Aust et al. .................. 74/411.5
2008/0240922 A1* 10/2008 Eusterbarkey ............ 416/204 R FOREIGN PATENT DOCUMENTS
| DE | 102 31 948 A1 | 1/2004 |
| DE | 103 51 524 A1 | 12/2004 |
| EP | 103 51 524 A1 | 12/2004 |
| WO | 2007085644 A1 | 8/2007 |
| WO | 2008092448 A | 8/2008 |
| WO | 2008104257 | 9/2008 |

OTHER PUBLICATIONS

Grote/Feldhusen: Dubbel, Taschenbuch fur Maschinenebau, Spring 2007, S. 680, 681 ISBN 978-3, 540-49714-1 (Grote/Feldhusen: Dubbel, Handbook of Mechanical Engineering, Spring 1994, ISBN 3540198687).

* cited by examiner

Primary Examiner — Scott B Geyer
(74) Attorney, Agent, or Firm — Vidas, Arrett & Steinkraus, P.A.

(57) ABSTRACT

A wind energy plant and method for installing a rotor hub on a rotor shaft. At the end of the rotor shaft facing the rotor hub, a locking disk is attached on the rotor shaft, which has a multiplicity of bores for the preliminary attachment of the rotor hub, for installing it, the rotor hub is made to sit close to the locking disk, if required, the bores in the locking disk are made to overlap with corresponding bores in the rotor hub by rotating the rotor shaft and/or the rotor hub, starting from the rotor shaft side, the rotor hub is preliminarily screwed together with the locking disk through the bores of the locking disk and of the rotor hub, and starting from the interior space of the rotor hub, the rotor hub is definitely screwed together with the locking disk and the rotor shaft.

17 Claims, 5 Drawing Sheets

METHOD FOR INSTALLING A ROTOR HUB ON A ROTOR SHAFT OF A WIND ENERGY PLANT, AND A WIND ENERGY PLANT

CROSS-REFERENCE TO RELATED APPLICATIONS

Not applicable.

STATEMENT REGARDING FEDERALLY SPONSORED RESEARCH

Not applicable.

BACKGROUND OF THE INVENTION

The present invention is related to a method for installing a rotor hub on a rotor shaft of a wind energy plant. In addition, the present invention is related to a wind energy plant. In the construction of wind energy plants, the rotor hub has to be attached on the rotor shaft, which is installed on the plant tower, together with the machine casing of the plant. For this purpose, the rotor hub is set into an installation position with respect to the rotor shaft by means of a crane, with or without installed rotor blades. For reasons of industrial safety, the rotor hub hanging on the crane is not permitted to be entered by operators before its attachment on the rotor shaft. Thus, any attachment of the hub starting from the interior space of the hub is therefore not possible. This leads to difficulties, in particular with cylindrical rotor shafts without a marked flange for the attachment of the hub.

From DE 103 51 524 A1, the entire contents of which is incorporated herein by reference, a rotor bearing for a wind energy plant is known, in which according to one embodiment, the rotor hub is screwed together with a stiffening ring, which is matched into the inner bearing ring of the rotor bearing and which partly surrounds the drive train gear, and with a locking disk arranged between the stiffening ring and the hub. With this screwing, which constitutes the definite attachment of the hub, installation of the hub starting from the nacelle is said to be possible. Admittedly, the construction with an additional stiffening ring is sumptuous. Furthermore, this embodiment is not suited for attaching the rotor hub on cylindrical rotor shafts, in particular on those without a marked flange for the attachment of the hub. Conventional solutions, in which the rotor hub is first screwed together with the machine carrier or the rotor bearing casing, require a sumptuous accurate alignment of the master gauges for the holes of the rotor hub with a corresponding master gauge for the bores in the machine carrier or the rotor bearing casing, respectively. This can be achieved in a safe way only by a sumptuous rotation of the hub shortly before the installation via the sling gears or load reception means.

Starting from the clarified state of the art, the present invention is based on the objective to provide a method as well as a wind energy plant of the kind mentioned in the beginning, wherein the installation of the rotor hub is made possible in a simple and safe manner.

BRIEF SUMMARY OF THE INVENTION

The present invention solves the objective for a method for installing a rotor hub on a rotor shaft of a wind energy plant by performing the following steps consecutively: at the end of the rotor shaft (10) facing the rotor hub (12), a locking disk (18) is attached on the rotor shaft (10), which has a multiplicity of bores for the preliminary attachment of the rotor hub (12), for installing it, the rotor hub (12) is made to sit close to the locking disk (18), if required, the bores in the locking disk (18) are made to overlap with corresponding bores in the rotor hub (12) by rotating the rotor shaft (10) and/or the rotor hub (12), starting from the rotor shaft side, the rotor hub (12) is preliminarily screwed together with the locking disk (18) through the bores of the locking disk (18) and of the rotor hub (12), and starting from the interior space (42) of the rotor hub, the rotor hub (12) is definitely screwed together with the locking disk (18) and the rotor shaft (10).

For a wind energy plant with a rotor shaft and a rotor hub attached on the rotor shaft, the present invention solves the objective correspondingly in that a locking disk (18) with a plurality of bores for the preliminary attachment of the rotor hub (12) is arranged between the rotor shaft (10) and the rotor hub (12), that starting from the rotor shaft side, the locking disk (18) is screwed together with the rotor hub (12) through the bores of the locking disk (18) and corresponding bores of the rotor hub (12), and that in addition, the rotor hub (12) is definitely screwed together with the locking disk (18) and the rotor shaft, starting from the inner space (42) of the rotor hub.

The locking disk may have at least one bore in a per se known manner, into which a locking bolt can be inserted in order to lock the rotor shaft against rotational movement, for a maintenance procedure for instance. Also, the rotor shaft can be secured against rotation in the installation of the rotor hub. The rotor shaft can be a cylindrical rotor shaft. It may be a cast part, from spheroid graphite iron for instance. The rotor shaft can be realised without a flange for attachment of the rotor hub. The bores, the bores in the hub in particular, can of course be threaded bores also in this.

In the present context, with preliminary attachment is meant the time span until the rotor hub is also directly screwed together with the rotor shaft by the definite screwing from the inner space of the hub. The preliminary screwing can be a remaining one in particular, i.e. it may form the attachment of the rotor hub in the operation of the plant, together with the definite screwing. In particular, the connection through the preliminary screwing can be designed such that in the locking up, even the maximum moments (completely or partially) can be transferred directly from the rotor hub into the locking disk via the preliminary screw joint, and via the locking bolt into the bearing casing or the machine carrier. In principle, it would be also conceivable to release the preliminary screwing after the definite screwing.

According to the present invention, in the installation of the complete rotor or the rotor hub in the course of the construction of the plant, the rotor hub is set into an installation position with respect to the shaft by means of a crane for instance. At this point of time, the locking disk is already attached to the shaft. Preferably by rotating the drive train and with this the rotor shaft, as the case may be also by rotating the hub, the circles of screws of the hub and those of the locking disk provided for the preliminary screwing can be made to coincide with each other in a particularly simple manner.

After the arrangement of the hub in the installation position, the preliminary connection of the hub with the bearing mounted rotor shaft takes place according to the present invention via screwing together the hub with the locking disk, starting from out the machine housing of the wind energy plant. A secure installation of the rotor hub which hangs on a crane, for instance, is made possible through this. The preliminary screwing connects only the locking disk and the hub in particular. It serves as a remaining installation joint, so that the hub can be entered by operators from the inner side of the hub for the definite screwing. As a second step, the definite screwing of the hub on the rotor shaft and the locking disk takes place in a safe manner from the preliminarily attached and through this accessible rotor hub. In particular, the definite screwing connects only the rotor hub, the locking disk and the rotor shaft. It provides the attachment security of the hub on the shaft which is required in the operation of the plant.

By the present invention, screwing the rotor hub together with the rotor shaft is made possible via the locking disk, without having to enter the hub before a first attachment on the rotor shaft. Just with cylindrical rotor shafts or rotor shafts without marked attachment flange, it is necessary to perform the definite screw joining between rotor hub and rotor shaft starting from out the rotor shaft. According to the present invention, this is made possible in a safe manner due to the preliminary connection. The industrial safety requirements are always maintained. All the wind loads occurring during the installation time are securely dissipated into the bearing housing and/or the machine carrier via the rotor shaft, which is locked up against rotation. In this, the wind energy plant according to the present invention is distinguished through a compact and secure connection of the hub with the shaft.

According to a preferred embodiment, the locking disk is screwed together with the rotor shaft by means of banjo bolts. The banjo bolts have an exterior thread for screwing them into corresponding threads in the rotor shaft. For screwing, the banjo bolts may feature a hexagon socket, for instance. In this, the screwing of the locking disk takes place starting from the side of the locking disk turned away from the rotor shaft. When using banjo bolts, the definite screwing together of the rotor hub with the locking disk and the rotor shaft can take place in a further preferred fashion by studs, which are plugged through the banjo bolts and screwed into corresponding threads of the rotor shaft. Thus, only one circle of screws is required for the attachment of the locking disk on the rotor shaft and the consecutive definitive screwing of the rotor hub with the locking disk and the rotor shaft. Of course, even other arbitrary screws, hexagon head cap screws for instance, can be used instead of the studs.

When using banjo bolts, it is also possible that the same have an internal thread, and that the definite screwing of the rotor hub with the locking disk and the rotor shaft takes place by studs which are screwed into the internal thread of the banjo bolts. Then, the studs may be screwed up in the banjo bolts only. For the definite screwing, no additional threaded bores have to be provided in the rotor shaft in addition to the threaded bores provided in the rotor shaft for screwing up the banjo bolts. The rotor shaft is secured only by screwing the studs into the banjo bolts. In cast parts, like rotor shafts, the load of internal threads may be limited due to the smaller strength. In order to increase the strength in the thread, so-called helicoil inserts are partly used, which increase the effective thread diameter and thus increase the loading capacity of the thread in the cast part. A banjo bolt with internal and external thread takes over this functionality. Thus, with this embodiment, the carrying capacity of the thread in the rotor shaft is increased, and a particularly secure connection is achieved. Again, even other screws, hexagon head cap screws for instance, can be used instead of the studs.

A particularly simple and compact connection of the locking disk with the rotor hub results when the locking disk has an attachment flange in its outer region, for attachment with a corresponding flange of the rotor hub. Thus, the rotor hub can have a corresponding flange. The attachment flanges can each have a planar bearing surface. For the attachment, the attachment flange of the locking disk is made to sit closely on the corresponding planar bearing surface of the attachment flange of the rotor hub. It is possible to arrange the bores of the locking disk in the attachment flange for preliminary attachment of the rotor hub. In this case, the locking disk has a (partial) circle of screws situated on the exterior, via which the preliminary screwing of the rotor hub takes place.

According to an extension related to this, the attachment flange is connected via stiffening ribs with an inner attachment flange, provided concentrically to the attachment flange and having a plurality of bores for definitely screwing together the rotor hub with the locking disk and the rotor shaft. The inner attachment flange has also a planar bearing surface, through which it is made to sit closely to a corresponding planar bearing surface of the rotor hub for the installation. The rotor hub may also have corresponding stiffening ribs for the connection of its attachment flange with the remaining parts of the hub. The stiffening ribs can end up in a plane with the bearing surfaces of the respectively attachment flange, or they can end up offset back with respect to this bearing surface. By the large planar site joint between rotor hub and locking disk for the preliminary attachment, in connection with stiffening ribs in the locking disk and/or the flange surface of the rotor hub, there results a particularly thin-walled and thus material saving and through this lightweight and cost-saving construction on the one hand. On the other hand, the specially formed flange regions of the locking disk and when necessary of the rotor hub form a hollow section with stiffening ribs after tensioning the outside situated preliminary screwing and the inside situated screwing between rotor hub, locking disk and rotor shaft. The hollow section is generated by the screwing of two shells via one partial circle on the outside and another one on the inside, and it forms a stiff connection construction arranged at the front side of the rotor hub with small wall thickness. Through this circumferential hollow section, a particularly stiff connection is achieved.

The wind energy plant according to the present invention can be installed with the method of the present invention in particular.

DETAILED DESCRIPTION OF THE SEVERAL VIEWS OF THE DRAWINGS

An example of the realisation of the present invention is explained in more detail in the following by means of drawings. Schematically show.

DETAILED DESCRIPTION OF THE INVENTION

Figure 1:
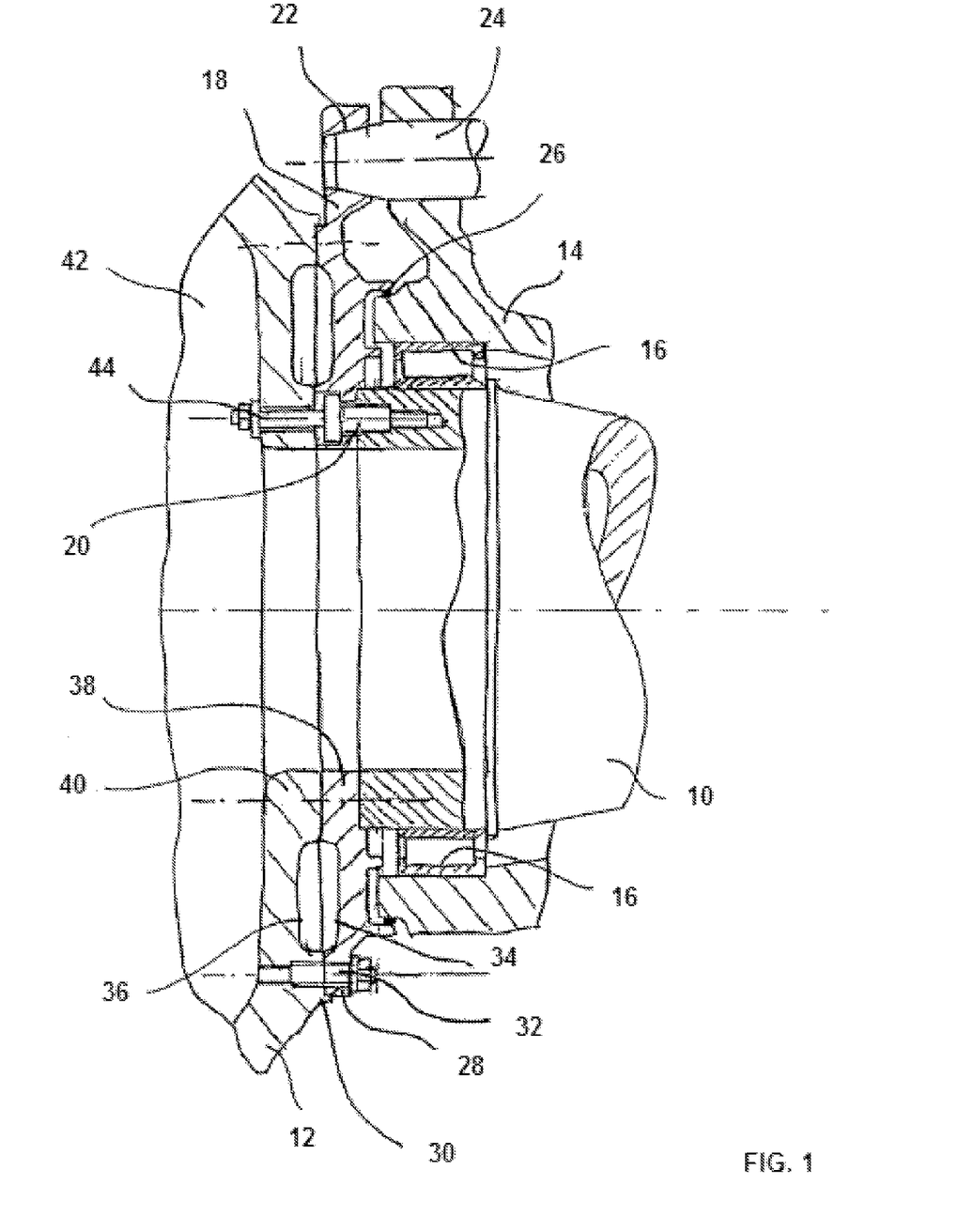
FIG. 1 a cut-out of an installation connection of the present invention between the rotor hub and the rotor shaft of a wind energy plant, in a cross section, FIG. 2 a magnified cut-out of the depiction from FIG. 1, FIG. 3 a further cut-out of an installation connection of the present invention between the rotor hub and the rotor shaft, in a cross section, FIG. 4 a sectional view along the line A-A from FIG. 3, in a cut-out, and FIG. 5 a magnified cut-out of an installation connection of the present invention between the rotor hub and the rotor shaft, according to a further example of realisation, in a cross section.

While this invention may be embodied in many different forms, there are described in detail herein a specific preferred embodiment of the invention. This description is an exemplification of the principles of the invention and is not intended to limit the invention to the particular embodiment illustrated As far as not indicated otherwise, equal reference signs designate equal objects in the figures. In FIG. 1 is depicted an installation connection between a rotor shaft 10 of spheroid graphite iron, cylindrical in the region of the connection to the rotor hub, and a rotor hub 12. The rotor shaft 10 is rotatably mounted in a rotor bearing casing 14 via a rotor bearing 16, presently a movable bearing 16. A locking disk 18 is screwed together with the rotor shaft 10 by means of a plurality of banjo bolts 20. The banjo bolts 20, from which only those screws 20 provided in the upper half of the figure are depicted in FIG. 1 for reasons of neat visibility, have an external thread, through which they engage into a corresponding thread of the rotor shaft 10. The locking disk 18 further has a bore 22, into which can be introduced a locking bolt 24 in order to lock the locking disk 18, and with this the rotor shaft 10 and the rotor hub 12. A sealing system 26 for the rotor bearing is provided between the locking disk 18 and the rotor bearing casing 14.

In its outer region, the locking disk 18 has an attachment flange 28. The rotor hub 12 has a corresponding flange 30. The flanges 28, 30 each have a planar bearing surface, by which they are made to sit close one to the other for the installation. For a more easy installation, the two attachment flanges 28, 30 can be centred via a recess in the flange region. However, centring is possible also in another way, for instance via studs used for screwing up. The attachment flanges 28, 30 of the locking disk 18 and of the rotor hub 12, sitting close to each other, are each at a time connected by stiffening ribs 34, 36 to inner attachment flanges 38, 40, which are provided concentrically to the attachment flanges 28, 30. The inner attachment flanges 38, 40 have each one also a planar bearing surface, by which they are they are made to sit close one to the other. In this way, a particularly lightweight, thin-walled and simultaneously stiff connection construction is achieved. A plurality of bores are provided in the attachment flanges 28, 30, from which only the bores provided in the lower half of the figure are depicted in FIG. 1 for reasons of neat visibility. By means of studs 32 guided through these bores starting from the machine casing of the wind energy plant (not shown), the rotor hub 12 is preliminarily screwed together with the locking disk 18, and through this connected to the rotor shaft 10. A plurality of bores are provided in the inner attachment flanges 38, 40, from which again only the bores provided in the upper half of the figure are depicted in FIG. 1 for reasons of neat visibility. By means of studs 44, plugged through the banjo bolts 20 starting from the interior space 42 of the hub, the rotor hub 12 is definitively screwed together with the locking disk 18 and the rotor shaft 10. This screwing is depicted in a magnified view in FIG. 2. The studs 44 are plugged through the banjo bolts 20 and screwed into corresponding threaded bores in the rotor shaft 10. The studs 32 can also be screwed into the rotor hub 12 in advance and can be laced up into the bores of the locking disk 18 in the installation. The connection can be prestressed by nuts. In principle, the screws 32 can be formed arbitrarily, for instance as hexagon head cap screws or studs with a nut, as this is depicted in the figures. The same applies for the screws 44 for the definite screwing. When locking by means of the locking bolt 24 in the locking disk 18, the torques from the rotor hub 12 can be dissipated into the bearing casing or the machine carrier, respectively, via the screw connection 32, the locking disk 18 and the locking bolt 24.

Figure 2:
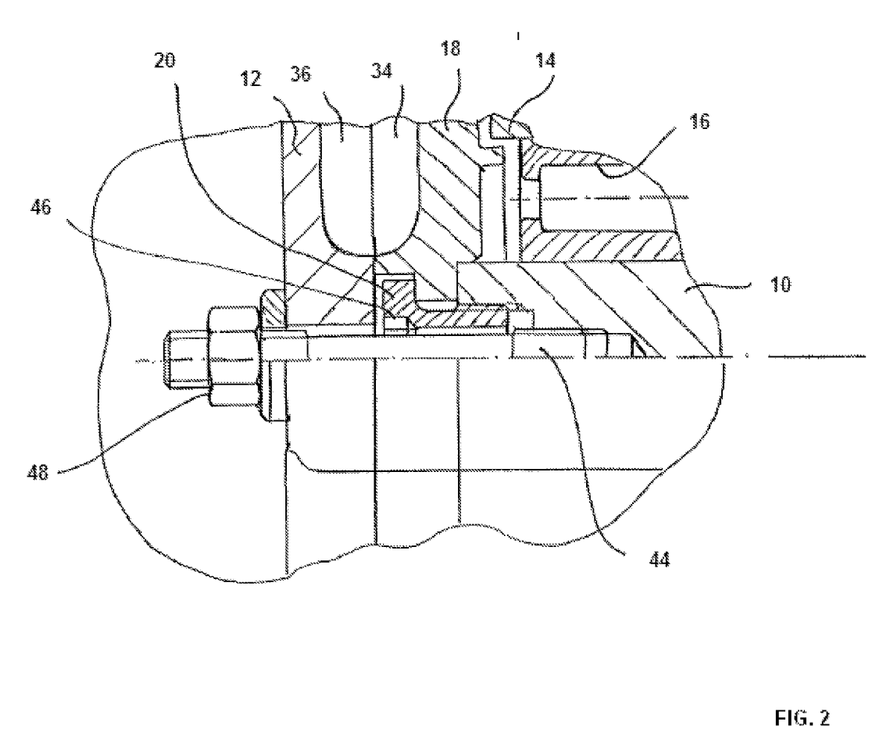
Figure 3:
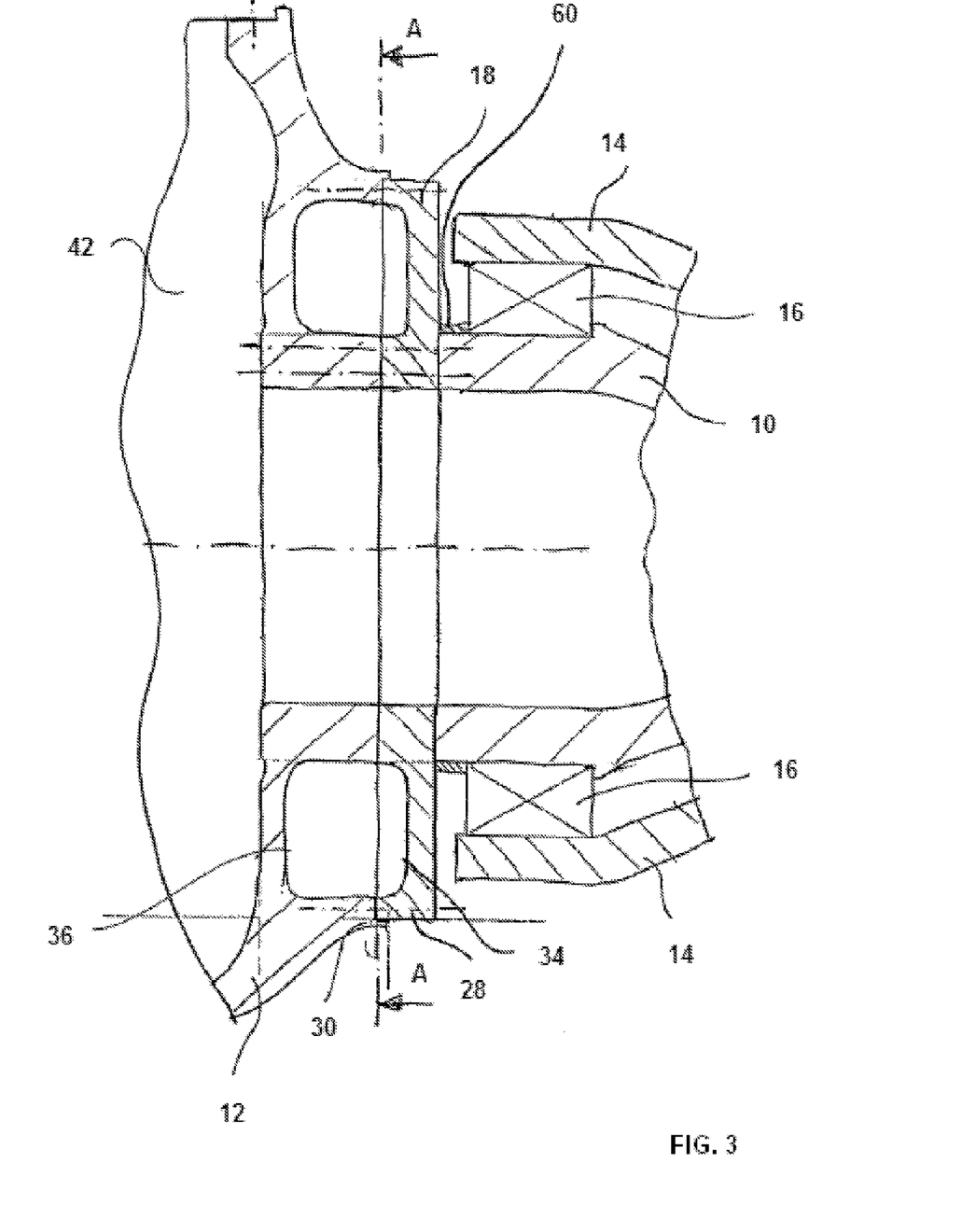
Figure 4:
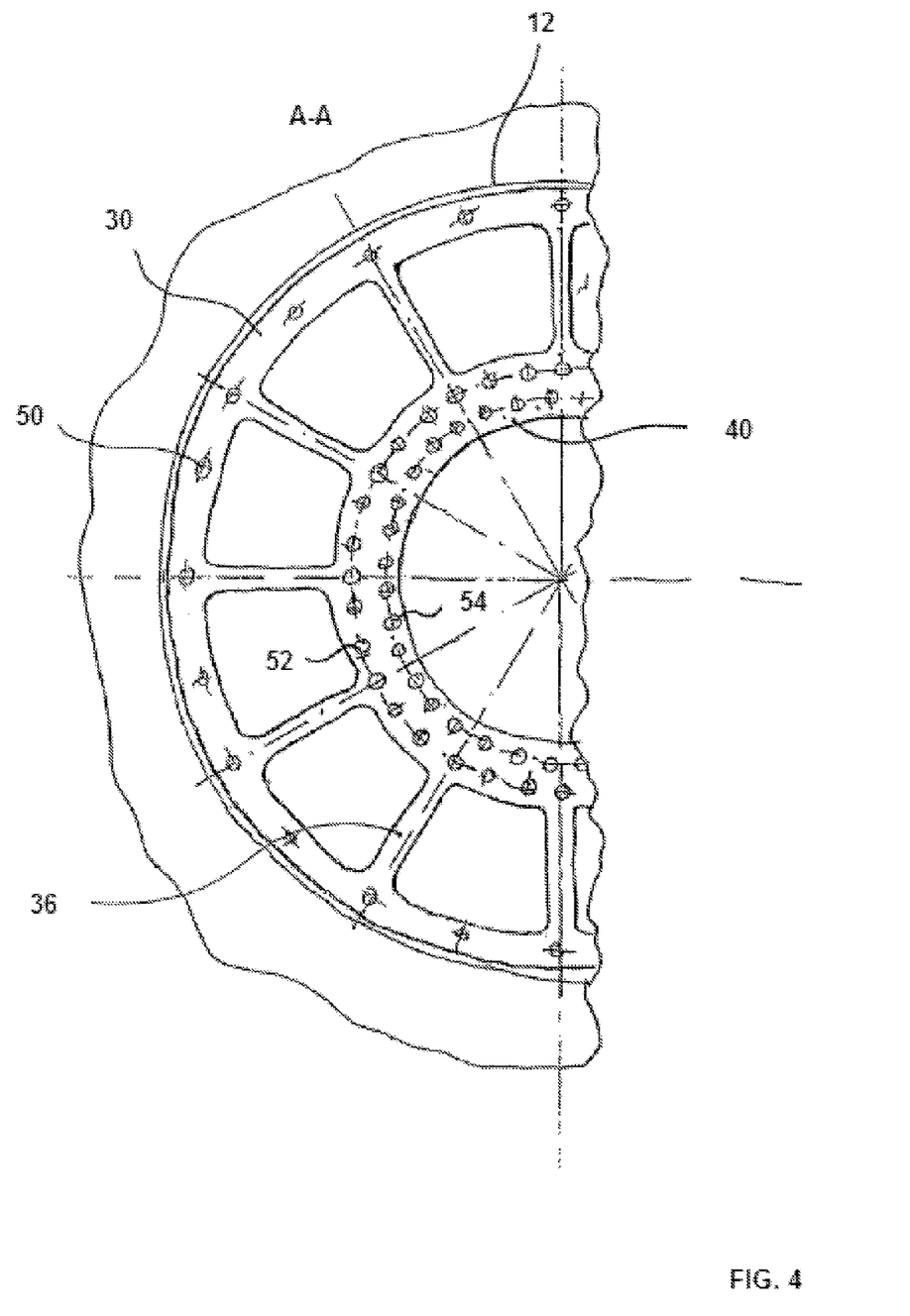

In order to install the connection depicted in the FIGS. 1 and 2, the locking disk 18 is screwed up first on the end of the rotor shaft 10 facing the rotor hub by means of the banjo bolts 20. For this purpose, the banjo bolts 20 plugged through the locking disk 18 are tightly screwed into a corresponding thread of the rotor shaft 10 with their external threads via a hexagon socket 46. Then, the rotor hub 12 is made to sit close to the locking disk 18 for installation, for instance by means of an installation crane. By a rotation of the gearbox output shaft, and with this of the rotor shaft 10, the bores provided in the locking disk 18 can be made to be coincident with the corresponding bores in the rotor hub 12. Thereafter, starting from the machine casing of the plant, thus from the rotor shaft side, the rotor hub 12 is preliminarily screwed together with the locking disk 18 by the studs 32 plugged through the attachment flanges 28, 30 of the locking disk 18 and the rotor hub 12, respectively. This screwing is a remaining one in the operation of the plant, in particular in connection with the design with stiffening ribs. The interior space 42 of the rotor hub 12 can now be entered by operators. By these operators, the rotor hub 12 can then be definitively screwed together with the locking disk 18 and the rotor shaft 10. For this purpose, the studs 44 are plugged through the banjo bolts 20 and screwed into a corresponding thread in the rotor shaft 10. Nuts 48 are screwed up on the studs 44 for prestressing. The studs can also be screwed into the rotor shaft before the installation of the rotor hub, and then be used for centring. The screwings provided for the screws 20, 32 and 44, respectively, take place along a respective circle of screws In FIG. 3, a further installation connection according to the present invention is depicted, which essentially corresponds to the connection depicted in FIG. 1 and 2 with respect to its construction and its installation. For reasons of neat visibility, the screwings are not depicted in detail in FIG. 3. FIG. 4 depicts a section along the line A-A from FIG. 3, and shows the rotor hub 12 of the present invention. One recognises the attachment flange 30 provided in the exterior region, with bores 50 provided along a circle for the preliminary screwing of the hub 12 with the locking disk 18. Furthermore, an inner attachment flange 40 provided concentrically to the attachment flange 30 can be seen in FIG. 4. The inner attachment flange 40 has also a plurality of bores 52, 54, which are formed along two coaxially arranged circles of screws in the depicted example. Higher bending- and torsional moments can be transmitted by plural circles of screws. In order to be able to arrange the circles of screws as close to each other as possible for keeping the wall thickness of the rotor shaft as small as possible, the bores are arranged offset from each other. The locking disk 18 has bores corresponding to the bores 50, 52, 54 of the rotor hub 12. The inner attachment flange 40 is connected to the outer attachment flange 30 via a plurality of stiffening ribs 36.

Figure 5:
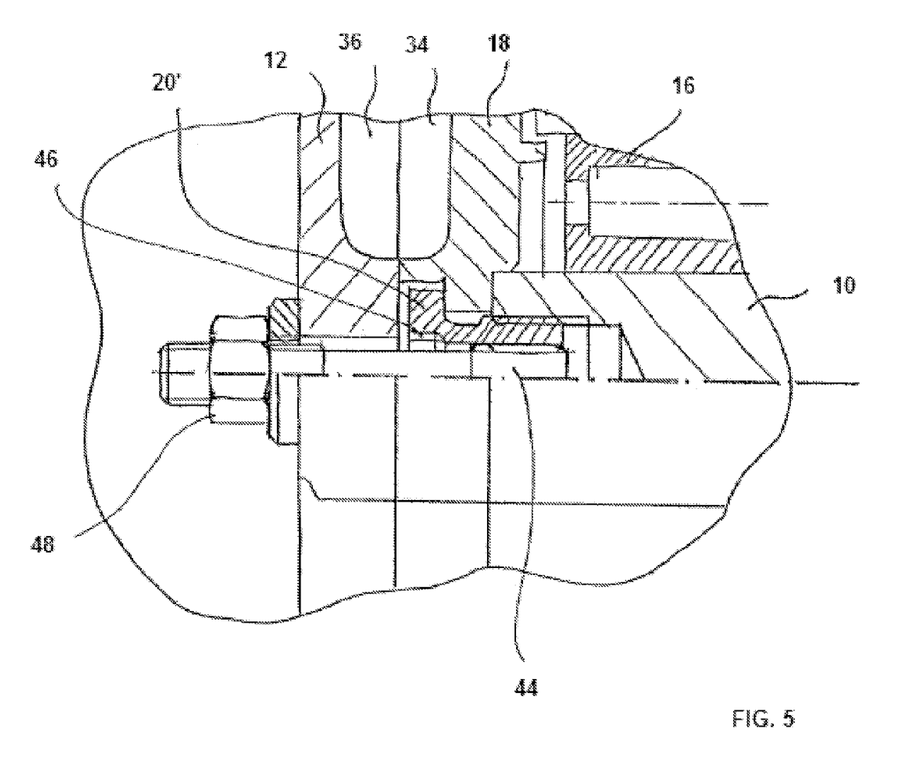

FIG. 5 shows the definitive screwing of the rotor hub 12 with the rotor shaft 10 via the locking disk 18 shown in FIG. 2, according to an alternative embodiment. In this example, the banjo bolts 20' have also an internal thread, besides to their external thread for screwing them in into the rotor shaft 10. The studs 44 for the definitive screwing of the rotor hub 12 on the shaft 10 are only screwed into the internal thread of the banjo bolts 20' in this example. Thus, a particularly load resistant thread is formed in the rotor shaft 10 which is formed as a cast part. For the rest, the installation connection shown in FIG. 5 corresponds to the connection shown in FIGS. 1 and 2 with respect to its construction and its installation. According to the present invention, the locking disk 18 can be also used for the axial securing of the movable bearing 16 (inner raceway) if necessary. This is depicted in FIG. 3 at the position 60. The number of the used banjo bolts 20, 20' depends on the load condition in the event of installation.

In principle, it is also conceivable to connect the locking disk 18 by means of screws whose head is sunk in the locking disk 18 (no banjo bolts). Then, the attachment of the rotor hub 12 takes place via a second inner circle of bores. The hub itself has only one circle of holes in this case.

The above disclosure is intended to be illustrative and not exhaustive. This description will suggest many variations and alternatives to one of ordinary skill in this art. All these alternatives and variations are intended to be included within the scope of the claims where the term "comprising" means "including, but not limited to". Those familiar with the art may recognize other equivalents to the specific embodiments described herein which equivalents are also intended to be encompassed by the claims.

Further, the particular features presented in the dependent claims can be combined with each other in other manners within the scope of the invention such that the invention should be recognized as also specifically directed to other embodiments having any other possible combination of the features of the dependent claims. For instance, for purposes of claim publication, any dependent claim which follows should be taken as alternatively written in a multiple dependent form from all prior claims which possess all antecedents referenced in such dependent claim if such multiple dependent format is an accepted format within the jurisdiction (e.g. each claim depending directly from claim 1 should be alternatively taken as depending from all previous claims). In jurisdictions where multiple dependent claim formats are restricted, the following dependent claims should each be also taken as alternatively written in each singly dependent claim format which creates a dependency from a prior antecedent-possessing claim other than the specific claim listed in such dependent claim below.

This completes the description of the preferred and alternate embodiments of the invention. Those skilled in the art may recognize other equivalents to the specific embodiment described herein which equivalents are intended to be encompassed by the claims attached hereto.

What is claimed is:

1. A wind energy plant with a rotor shaft and a rotor hub attached on the rotor shaft, characterised in that a locking disk (18) with a plurality of bores for the preliminary attachment of the rotor hub (12) is arranged between the rotor shaft (10) and the rotor hub (12), that starting from the rotor shaft side, the locking disk (18) is screwed together with the rotor hub (12) through the bores of the locking disk (18) and corresponding bores of the rotor hub (12), only connecting the locking disk (18) with the rotor hub (12), and that in addition, the rotor hub (12) is definitely screwed together with the locking disk (18) and the rotor shaft, starting from an inner space (42) of the rotor hub.

2. A wind energy plant according to claim 1, characterised in that the locking disk (18) is screwed together with the rotor shaft (10) by means of banjo bolts (20, 20').

3. A wind energy plant according to claim 2, characterised in that the rotor hub (12) is screwed together with the locking disk (18) and the rotor shaft (10) by studs (44), which are plugged through the banjo bolts (20) and screwed into corresponding threads of the rotor shaft (10).

4. A wind energy plant according to claim 2, characterised in that the banjo bolts (20') have an internal thread, and that the rotor hub (12) is screwed together with the locking disk (18) and the rotor shaft (10) by studs (44) which are screwed into the internal thread of the banjo bolts (20').

5. A wind energy plant according to claim 1, characterised in that at its outer region, the locking disk (18) has an attachment flange (28) for attachment with a corresponding flange (30) of the rotor hub (12).

6. A wind energy plant according to claim 5, characterised in that the attachment flange (28) is connected with an inner attachment flange (38) via stiffening ribs (34), provided concentrically to the attachment flange (28) and having a plurality of bores for screwing together the rotor hub (12) with the locking disk (18) and the rotor shaft (10).

7. A wind energy plant according to claim 1, characterised in that the bores of the locking disk (18) are arranged for the preliminary attachment of the rotor hub (12) in an attachment flange (28).

8. A method for installing a rotor hub on a rotor shaft of a wind energy plant, in which the following steps are performed:
at the end of the rotor shaft (10) facing the rotor hub (12), a locking disk (18) is attached on the rotor shaft (10), which has a multiplicity of bores for the preliminary attachment of the rotor hub (12),
the rotor hub (12) having bores is positioned near to the locking disk (18),
starting from the rotor shaft side, the rotor hub (12) is preliminarily screwed together with the locking disk (18) through the bores of the locking disk (18) and of the rotor hub (12), only connecting the locking disk (18) with the rotor hub (12), and
starting from an interior space (42) of the rotor hub (12), the rotor hub (12) is definitely screwed together with the locking disk (18) and the rotor shaft (10).

9. A method according to claim 8, characterised in that the locking disk (18) is screwed together with the rotor shaft (10) by means of banjo bolts (20, 20').

10. A method according to claim 9, characterised in that the definite screwing together of the rotor hub (12) with the locking disk (18) and the rotor shaft (10) takes place by studs (44) which are plugged through the banjo bolts (20) and screwed into corresponding threads of the rotor shaft (10).

11. A method according to claim 9, characterised in that the banjo bolts (20') have an internal thread, and that the definite screwing together of the rotor hub (12) with the locking disk (18) and the rotor shaft (10) takes place by studs (44) which are screwed into the internal thread of the banjo bolts (20').

12. A method according to claim 8, characterised in that the locking disk (18) has an attachment flange (28) in its outer region, for attachment with a corresponding flange (30) of the rotor hub (12).

13. A method according to claim 12, characterised in that the attachment flange (28) is connected with an inner attachment flange (38) via stiffening ribs (34), provided concentrically to the attachment flange (28) and having a plurality of bores for definitely screwing together the rotor hub (12) with the locking disk (18) and the rotor shaft (10).

14. A method according to claim 8, characterised in that the bores of the locking disk (18) are arranged in an attachment flange (28) for the preliminary attachment of the rotor hub (12).

15. The method according to claim 1, characterized in that the step of positioning the rotor hub (12) near the locking disk (18) includes rotating the rotor shaft (10) or the rotor hub (12) or the rotor shaft and rotor hub (12) to overlap the bores in the locking disk (18) with corresponding bores in the rotor hub (12).

16. A method for installing a rotor hub on a rotor shaft of a wind energy plant, wherein the rotor hub has bores, comprising the steps of:
attaching a locking disk at the end of the rotor shaft facing the rotor hub, which has a multiplicity of bores for the preliminary attachment of the rotor hub;
the rotor hub being positioned near the locking disk;
preliminarily screwing together the rotor hub with the locking disk, through the bores of the locking disk and the rotor hub, starting from the rotor shaft side, and only connecting the locking disk with the rotor hub, and definitely screwing together the rotor hub and the locking disk and the rotor shaft, starting from an interior space of the rotor hub.

17. The method according to claim 15, characterized in that the step of positioning the rotor hub (12) near the locking disk (18) includes rotating the rotor shaft (10) or the rotor hub (12) or the rotor shaft and rotor hub (12) to overlap the bores in the locking disk (18) with corresponding bores in the rotor hub (12).

* * * * *